(No Model.)

G. B. BRAYTON.
JOURNAL BEARING.

No. 262,565. Patented Aug. 15, 1882.

Witnesses:
Philip F. Larner
Howell Bartle

Inventor:
George B. Brayton
By Wm C. Wood
Attorney

UNITED STATES PATENT OFFICE.

GEORGE B. BRAYTON, OF BOSTON, MASSACHUSETTS, ASSIGNOR TO THE BRAYTON PETROLEUM ENGINE COMPANY, OF HARTFORD, CONN.

JOURNAL-BEARING.

SPECIFICATION forming part of Letters Patent No. 262,565, dated August 15, 1882.

Application filed April 28, 1880. (No model.)

*To all whom it may concern:*

Be it known that I, GEORGE B. BRAYTON, of Boston, in the county of Suffolk and State of Massachusetts, have invented certain new and useful Improvements in Journals for the Shafts of Screw-Propellers; and I do hereby declare that the following specification, taken in connection with the drawings furnished and forming a part of the same, is a clear, true, and complete description of my invention.

As heretofore constructed screw-propeller shafts are either provided with recessed journals or with collars, whereby the longitudinal thrust and draft on the shaft incident to the forward and backward rotation of the screw are resisted by the contact of the sides of the recessed journals, or the sides of the collars with the sides of the journal-boxes of the shaft. This resisting-contact with the journal-boxes is conducive to much friction and heated boxes, and in order to lessen said friction anti-friction wheels mounted on radial studs on a collar loosely mounted on the shaft have been heretofore employed, but in such a manner that the friction was lessened only when the screw was revolved for a forward movement of the vessel.

One object of my invention is to obviate undue friction incident not only to a forward rotation of the screw, but also to its backward rotation; and, still further, to provide simple, strong, durable, and effective anti-frictional mechanism for boxes of screw-propeller shafts.

My invention consists in the combination, with the propeller-shaft, of a journal-box annularly channeled on one side thereof, an abutment-plate surrounding said shaft, coincident with the side of said box, secured thereto, and annularly channeled on its inner face, a collar annularly channeled at each end, secured to said shaft, and interposed between said box and plate, and two series or sets of spheres occupying the annular channels at each end of said collar.

To more particularly describe my invention, I will refer to the accompanying drawings, in which—

Figure 1:
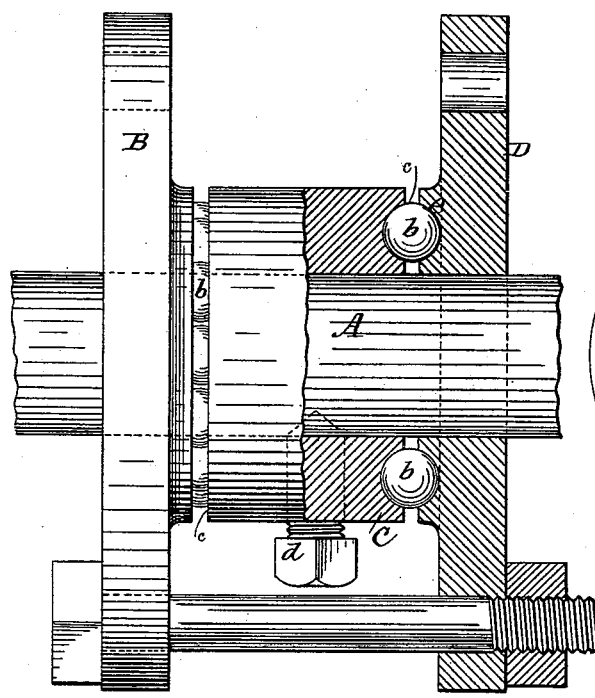
Figure 2:
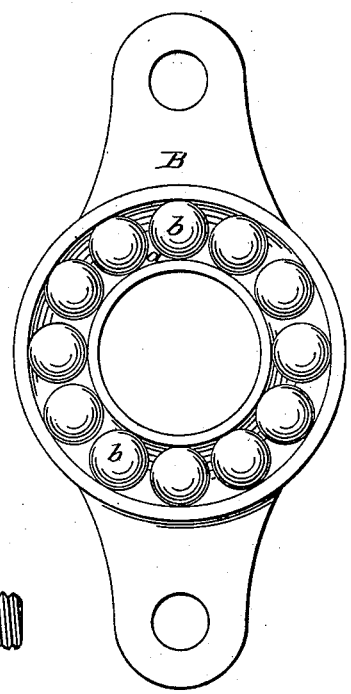

Figure 1 is a top view, partially sectional, of a propeller-shaft and box embodying my invention. Fig. 2 is a side view of the annularly-channeled abutment-plate and its set of spheres detached from the box.

The propeller-shaft A will be understood as projecting toward the right hand to the screw, so that when the latter is rotated to drive the vessel forward the thrust is against the rear side of the journal-box B. On the rear side of said box—*i. e.*, toward the screw—is an annular channel, *a*, of any required dimensions, concentric to the journal-bearing. This channel is in cross-section, preferably in the arc of a circle, corresponding generally with the circumferential outline of the metal spheres *b*, and it is of sufficient depth to securely hold the spheres in position when housed between the box and the collar C, which is similarly channeled, as at *c*, at both of its ends. This collar is provided with a heavy set-screw, *d*, which should have a secure seat in the shaft A, as indicated in the drawings.

The rear side of the box B constitutes a vertical abutment for resisting the thrust of the screw on its shaft, and the plate D constitutes a second abutment for resisting the draft on the shaft incident to the backward movement of the screw. This plate D is annularly channeled on one side, as at *e*, to correspond with the channel in the coincident end of the collar C, and between them in said channels a second set of spheres *b* are loosely housed.

The plate D is firmly secured in a position parallel with the coincident side of the box B by means of strong tie-bolts occupying bolt-holes in the plate and box.

The metal spheres may be composed of iron, steel, bronze, or other suitable metal, and they should be of uniform size, and used in sufficient number, placed side by side, to well fill the grooves circumferentially and afford a uniform bearing as between the collar and the box and plate.

In operation the spheres are constantly changing position in a circular line without twist or strain on the collar, and but little attention or lubrication is required for maintaining them in proper operative condition.

Having before herein indicated several variations in the application of my invention, I do not limit myself to the precise construction and arrangement shown, although I have proven by actual use the value of the particular construction and arrangement exhibited.

I am aware that it is not broadly new to employ spheres in annular channels for anti-friction bearings, for they have been heretofore used in connection with turn-tables for locomotives, heavy derricks, shafting, carriage-wheels, &c.

Having thus described my invention, I claim as new and to be secured by Letters Patent—

The combination, with a propeller-shaft, of a journal-box annularly channeled on one side, a similarly-channeled abutment-plate secured to the box, an interposed collar annularly channeled at both ends and secured to said shaft, and sets of spheres occupying said channels, substantially as and for the purposes specified.

GEO. B. BRAYTON.

Witnesses:
WM. H. ADAMS,
JOHN M. FOLEY.